United States Patent
Wu et al.

(10) Patent No.: US 12,468,180 B2
(45) Date of Patent: Nov. 11, 2025

(54) CONTACT LENS FOR COMMUNICATION

(71) Applicant: HTC Corporation, Taoyuan (TW)

(72) Inventors: Chun-Yih Wu, Taoyuan (TW); Ta-Chun Pu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 497 days.

(21) Appl. No.: 18/075,856

(22) Filed: Dec. 6, 2022

(65) Prior Publication Data
US 2024/0184140 A1 Jun. 6, 2024

(51) Int. Cl.
*G02C 7/04* (2006.01)
*G02C 11/00* (2006.01)

(52) U.S. Cl.
CPC .............. *G02C 7/049* (2013.01); *G02C 7/047* (2013.01); *G02C 11/10* (2013.01)

(58) Field of Classification Search
CPC ........ G02C 7/049; G02C 7/047; G02C 11/10; G02C 7/04; H01Q 1/44; H01Q 1/273
See application file for complete search history.

(56) References Cited

U.S. PATENT DOCUMENTS

| | | | |
|---|---|---|---|
| 6,076,930 A * | 6/2000 | Malchow | G02C 7/048 |
| | | | 351/247 |
| 2010/0103368 A1* | 4/2010 | Amirparviz | G02C 7/04 |
| | | | 977/920 |
| 2017/0042480 A1* | 2/2017 | Gandhi | A61B 5/14546 |
| 2017/0087014 A1* | 3/2017 | Potter, Jr. | A61F 9/00781 |
| 2018/0017813 A1* | 1/2018 | Perozziello | H01Q 1/22 |
| 2018/0043646 A1* | 2/2018 | Lai | G02C 7/04 |
| 2018/0224669 A1* | 8/2018 | Shtukater | G02C 7/04 |
| 2019/0293964 A1* | 9/2019 | Takaki | G02C 7/16 |
| 2019/0344076 A1* | 11/2019 | Irazoqui | G02C 7/04 |
| 2020/0203810 A1* | 6/2020 | Tsai | H01Q 1/245 |
| 2021/0290368 A1* | 9/2021 | Wiemer | H04N 9/3147 |
| 2021/0393126 A1* | 12/2021 | Dündar | A61B 3/16 |
| 2022/0269109 A1* | 8/2022 | Lee | H10D 86/443 |

* cited by examiner

*Primary Examiner* — William R Alexander
*Assistant Examiner* — Gabriel A Sanz
(74) *Attorney, Agent, or Firm* — Birch, Stewart, Kolasch & Birch, LLP

(57) ABSTRACT

A contact lens for communication includes a display unit, an antenna element, a first ring-shaped metal structure, a second ring-shaped metal structure, and a transparent element. The antenna element is adjacent to the display unit. The display unit and the antenna element are surrounded by the first ring-shaped metal structure. The first ring-shaped metal structure is surrounded by the second ring-shaped metal structure. The display unit, the antenna element, the first ring-shaped metal structure, and the second ring-shaped metal structure are disposed on the transparent element.

17 Claims, 4 Drawing Sheets

CONTACT LENS FOR COMMUNICATION

BACKGROUND OF THE INVENTION

Field of the Invention

The invention relates to a contact lens, and more particularly, to a contact lens for communication.

Description of the Related Art

Antennas are indispensable elements in the field of wireless communication. If an antenna used for signal reception and transmission has insufficient radiation gain, this may have a negative impact on the overall communication quality. Accordingly, it is an important issue for antenna designers to design a small-size and high-radiation-gain antenna element combined with a relative device.

BRIEF SUMMARY OF THE INVENTION

In a preferred embodiment, the invention proposes a contact lens for communication. The contact lens includes a display unit, an antenna element, a first ring-shaped metal structure, a second ring-shaped metal structure, and a transparent element. The antenna element is adjacent to the display unit. The display unit and the antenna element are surrounded by the first ring-shaped metal structure. The first ring-shaped metal structure is surrounded by the second ring-shaped metal structure. The display unit, the antenna element, the first ring-shaped metal structure, and the second ring-shaped metal structure are all disposed on the transparent element.

In some embodiments, the antenna element covers an operational frequency band, and the operational frequency band is higher than or equal to 60 GHz.

In some embodiments, the display unit substantially has a hexagonal shape or a circular shape.

In some embodiments, the display unit includes a metal sidewall, and the metal sidewall is used as a reflector of the antenna element.

In some embodiments, the antenna element includes a plurality of radiation elements. The radiation elements are separate from each other, and are all adjacent to the display unit.

In some embodiments, the first distance between the antenna element and the display unit is shorter than or equal to 0.25 wavelength of the operational frequency band.

In some embodiments, the first ring-shaped metal structure substantially has a circular ring shape.

In some embodiments, the diameter of the first ring-shaped metal structure is greater than the pupil diameter of an eyeball.

In some embodiments, the diameter of the first ring-shaped metal structure is greater than the iris diameter of an eyeball.

In some embodiments, each of the first ring-shaped metal structure and the second ring-shaped metal structure is used as a director of the antenna element.

In some embodiments, each of the first ring-shaped metal structure and the second ring-shaped metal structure is an energy storage element.

In some embodiments, the energy storage element is a thin film photovoltaic cell.

In some embodiments, the second distance between the first ring-shaped metal structure and the second ring-shaped metal structure is from 0.1 to 0.2 wavelength of the operational frequency band.

In some embodiments, each of the first ring-shaped metal structure and the second ring-shaped metal structure includes a plurality of discontinuous metal segments.

In some embodiments, the contact lens further includes a third ring-shaped metal structure. The second ring-shaped metal structure is surrounded by the third ring-shaped metal structure.

In some embodiments, the contact lens further includes a fourth ring-shaped metal structure. The third ring-shaped metal structure is surrounded by the fourth ring-shaped metal structure.

In some embodiments, the transparent element is made of a hydrogel material.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
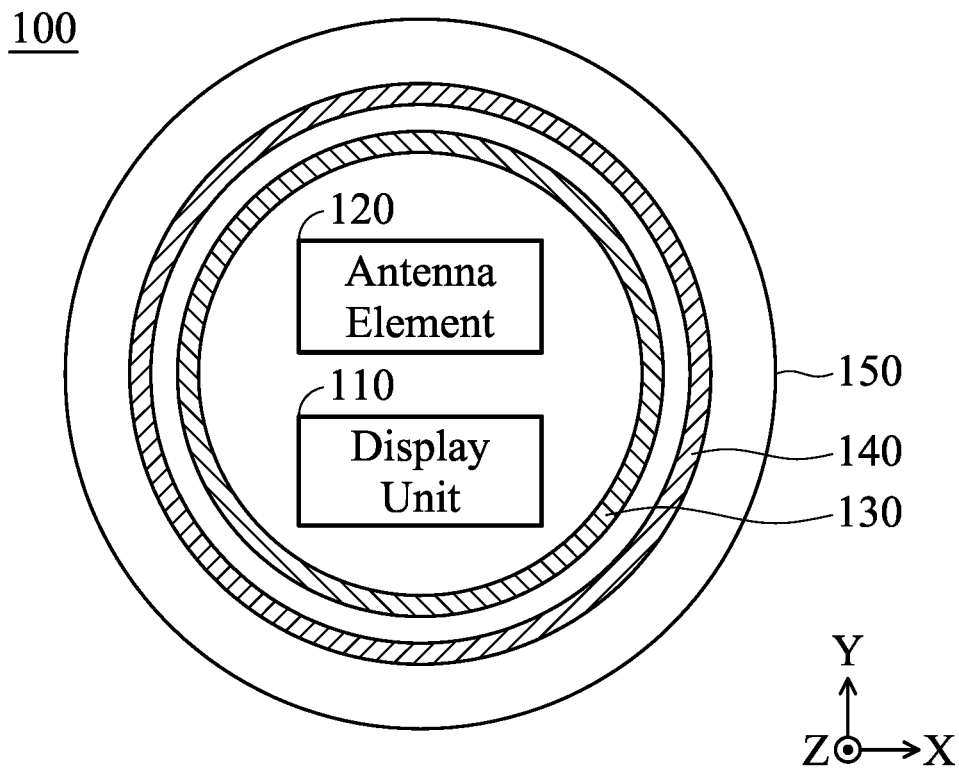
FIG. 1 is a diagram of a contact lens according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a contact lens 100 according to an embodiment of the invention. The contact lens 100 can support the function of communication. In the embodiment of FIG. 1, the contact lens 100 includes a display unit 110, an antenna element 120, a first ring-shaped metal structure 130, a second ring-shaped metal structure 140, and a transparent element 150. It should be understood that the contact lens 100 may further include other components, such as a processor and/or a power supply module, although they are not displayed in FIG. 1.

The shape and type of the display unit 110 are not limited in the invention. The antenna element 120 is adjacent to the display unit 110. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The antenna element 120 can cover an operational frequency band. The aforementioned operational frequency band may be higher than or equal to 60 GHz. Therefore, the antenna element 120 can support at least the wideband operations of mmWave (Millimeter Wave) or THz (Terahertz) communication. In some embodiments, the antenna element 120 is a monopole antenna, a dipole antenna, a loop antenna, a helical antenna, a patch antenna, a PIFA (Planar Inverted F Antenna), or a chip antenna, but it is not limited thereto.

Both the display unit 110 and the antenna element 120 are surrounded by the first ring-shaped metal structure 130. Furthermore, the first ring-shaped metal structure 130 is surrounded by the second ring-shaped metal structure 140. In some embodiments, both the first ring-shaped metal structure 130 and the second ring-shaped metal structure 140 are floating, and they are separate from each other. For example, the transparent element 150 may be made of a hydrogel material, but it is not limited thereto. The display unit 110, the antenna element 120, the first ring-shaped metal structure 130, and the second ring-shaped metal structure 140 are all disposed on the transparent element 150.

According to practical measurements, each of the first ring-shaped metal structure 130 and the second ring-shaped metal structure 140 is used as a director of the antenna element 120. For example, the first ring-shaped metal structure 130 and the second ring-shaped metal structure 140 may configured to almost modify the X-axis and Y-axis radiations of the antenna element 120 to the Z-axis directions thereof, but it is not limited thereto. With such a design, the radiation pattern of the antenna element 120 can be adjusted by appropriately arranging the first ring-shaped metal structure 130 and the second ring-shaped metal structure 140, thereby improving the overall radiation gain of the contact lens 100.

The following embodiments will introduce different configurations and detail structural features of the contact lens 100. It should be understood that these figures and descriptions are merely exemplary, rather than limitations of the invention.

Figure 2:
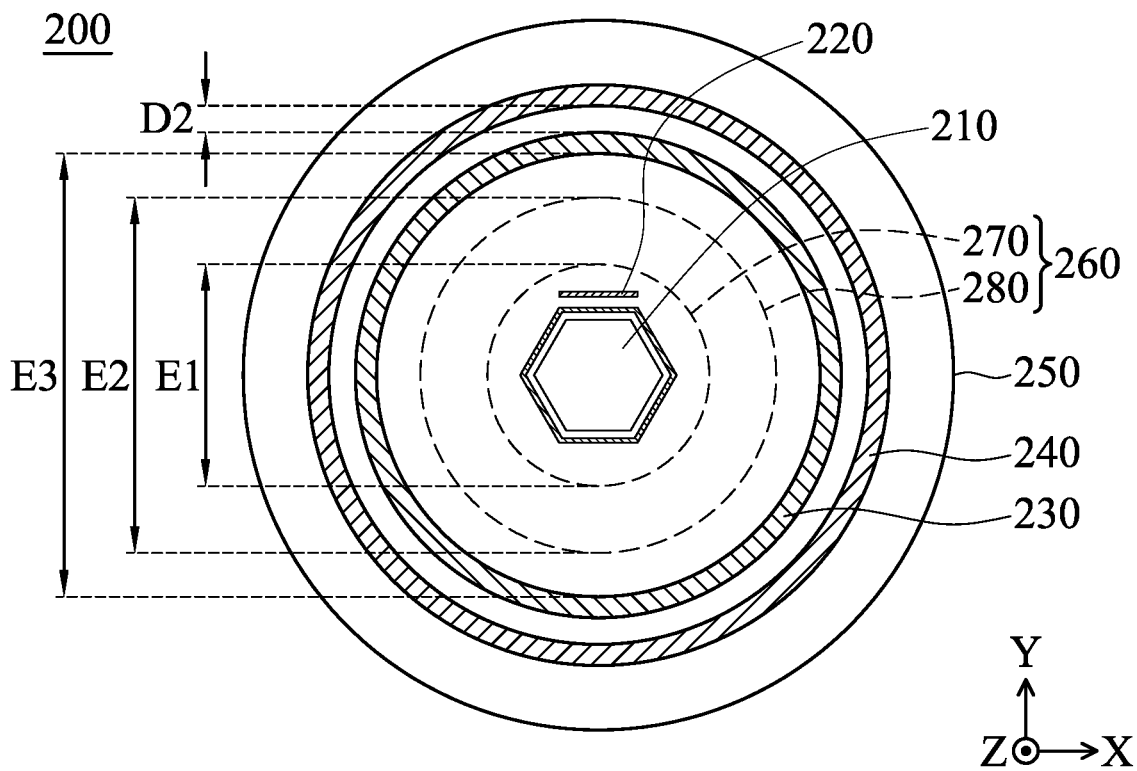
FIG. 2 is a top view of a contact lens according to an embodiment of the invention.
Figure 3:
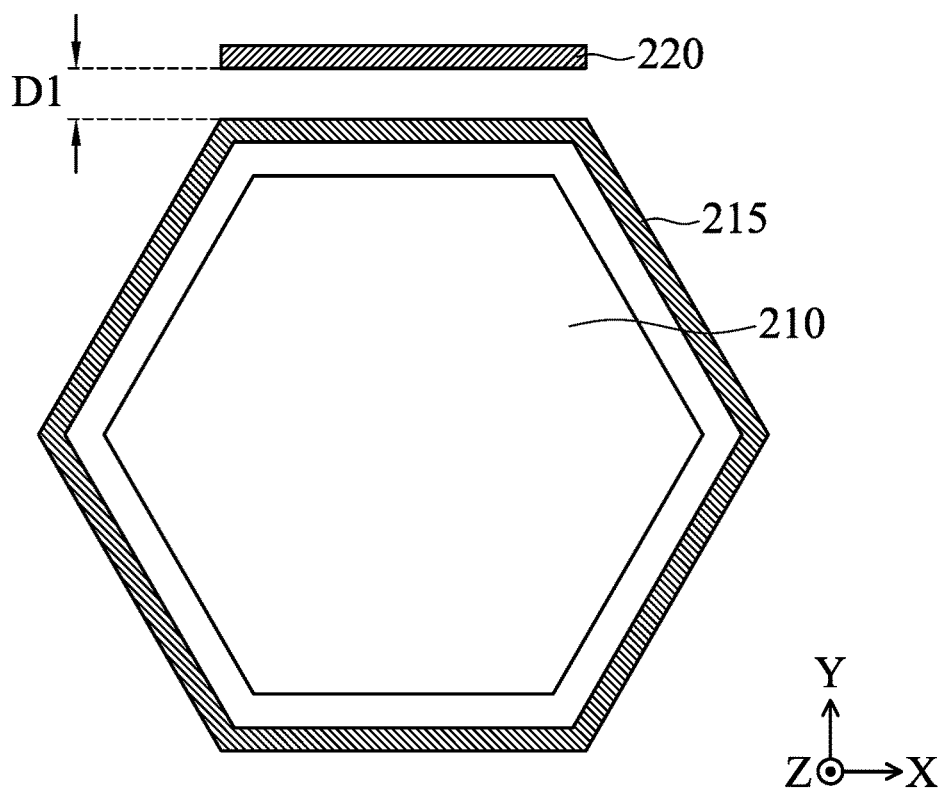
FIG. 3 is a partial view of a contact lens according to an embodiment of the invention.

FIG. 2 is a top view of a contact lens 200 according to an embodiment of the invention. FIG. 3 is a partial view of the contact lens 200 according to an embodiment of the invention. Please refer to FIG. 2 and FIG. 3 together. FIG. 2 and FIG. 3 are similar to FIG. 1. In the embodiment of FIG. 2 and FIG. 3, the communication device 200 includes a display unit 210, an antenna element 220, a first ring-shaped metal structure 230, a second ring-shaped metal structure 240, and a transparent element 250. The contact lens 200 is applied on an eyeball 260. The eyeball 260 includes a pupil 270 and an iris 280. It should be noted that the eyeball 260 does not belong to any part of the contact lens 200.

The display unit 210 may substantially have a hexagonal shape. The antenna element 220 is adjacent to the display unit 210. Specifically, the display unit 210 includes a metal sidewall 215. The metal sidewall 215 is used as a reflector of the antenna element 220. In other words, the metal sidewall 215 of the display unit 210 is also configured to fine-tune the radiation direction of the antenna element 220.

In some embodiments, the first distance D1 between the antenna element 220 and the display unit 210 (or the metal sidewall 215) is shorter than or equal to 0.25 wavelength ($\lambda/4$) of the operational frequency band of the antenna element 220. According to practical measurements, the aforementioned range of the first distance D1 can help to optimize the reflecting performance of the metal sidewall 215 of the display unit 210.

Both the display unit 210 and the antenna element 220 are surrounded by the first ring-shaped metal structure 230. The first ring-shaped metal structure 230 is surrounded by the second ring-shaped metal structure 240. The display unit 210, the antenna element 220, the first ring-shaped metal structure 230, and the second ring-shaped metal structure 240 are all disposed on the transparent element 250. For example, the first ring-shaped metal structure 230 may substantially have a relatively small circular ring shape, and the second ring-shaped metal structure 240 may substantially have a relatively large circular ring shape, but they are not limited thereto. The first ring-shaped metal structure 230 and the second ring-shaped metal structure 240 can share the same center of circle, and the display unit 210 may be substantially positioned at the aforementioned center of circle.

In some embodiments, the second distance D2 between the first ring-shaped metal structure 230 and the second ring-shaped metal structure 240 is from 0.1 to 0.2 wavelength ($\lambda/10 \sim 2\lambda/10$) of the operational frequency band of the antenna element 220. According to practical measurements, the aforementioned range of the second distance D2 can help to optimize the directing performance of the first ring-shaped metal structure 230 and the second ring-shaped metal structure 240.

In some embodiments, the diameter E3 of the first ring-shaped metal structure 230 is greater than the pupil diameter E1 of the eyeball 260. In alternative embodiments, the diameter E3 of the first ring-shaped metal structure 230 is also greater than the iris diameter E2 of the eyeball 260, so as to prevent the first ring-shaped metal structure 230 and the second ring-shaped metal structure 240 from obscuring the vision of the eyeball 260.

In some embodiments, each of the first ring-shaped metal structure 230 and the second ring-shaped metal structure 240 is an energy storage element. For example, the aforementioned energy storage element may be a thin film photovoltaic cell, but it is not limited thereto. With such a design, the directors of the antenna element 220 can be integrated with the corresponding energy storage elements, thereby reducing the whole size of the contact lens 200. Other features of the contact lens 200 of FIG. 2 and FIG. 3 are similar to those of the contact lens 100 of FIG. 1. Accordingly, the two embodiments can achieve similar levels of performance.

Figure 4:
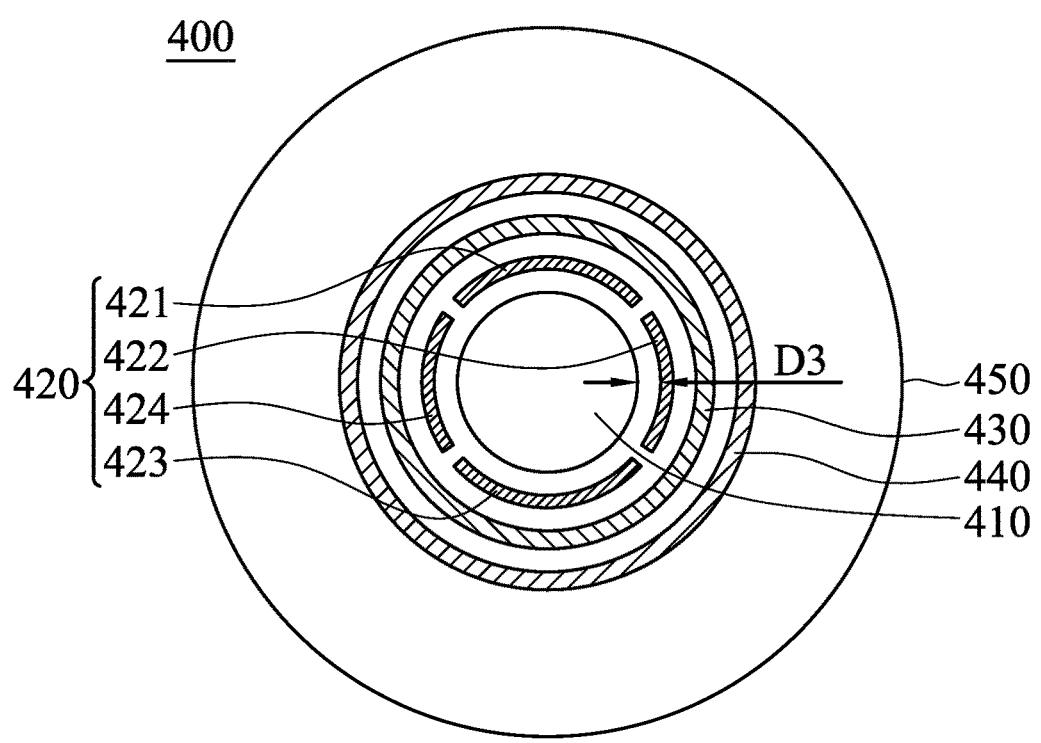
FIG. 4 is a top view of a contact lens according to an embodiment of the invention.

FIG. 4 is a top view of a contact lens 400 according to an embodiment of the invention. FIG. 4 is similar to FIG. 1. In the embodiment of FIG. 4, the contact lens 400 includes a display unit 410, an antenna element 420, a first ring-shaped metal structure 430, a second ring-shaped metal structure 440, and a transparent element 450. The display unit 410 may substantially have a circular shape. The antenna element 420 is adjacent to the display unit 410. Specifically, the antenna element 420 includes a plurality of radiation elements 421, 422, 423, and 424. The radiation elements 421, 422, 423, and 424 are separate from each other, and all of them are adjacent to the display unit 410. For example, each of the radiation elements 421, 422, 423, and 424 may substantially have an arc-shape, but it is not limited thereto. It should be noted that the total number of above radiation elements 421, 422, 423, and 424 is adjustable according to different requirements. In some embodiments, the first distance D3 between the display unit 410 and each of the radiation elements 421, 422, 423, and 424 is shorter than or equal to 0.25 wavelength ($\lambda/4$) of the operational frequency band of the antenna element 420. Both the display unit 410 and the antenna element 420 are surrounded by the first ring-shaped metal structure 430. The first ring-shaped metal structure 430 is surrounded by the second ring-shaped metal structure 440. The display unit 410, the antenna element 420, the first ring-shaped metal structure 430, and the second ring-shaped metal structure 440 are all disposed on the transparent element 450. Other features of the contact lens 400 of FIG. 4 are similar to those of the contact lens 100 of FIG. 1. Accordingly, the two embodiments can achieve similar levels of performance.

Figure 5:
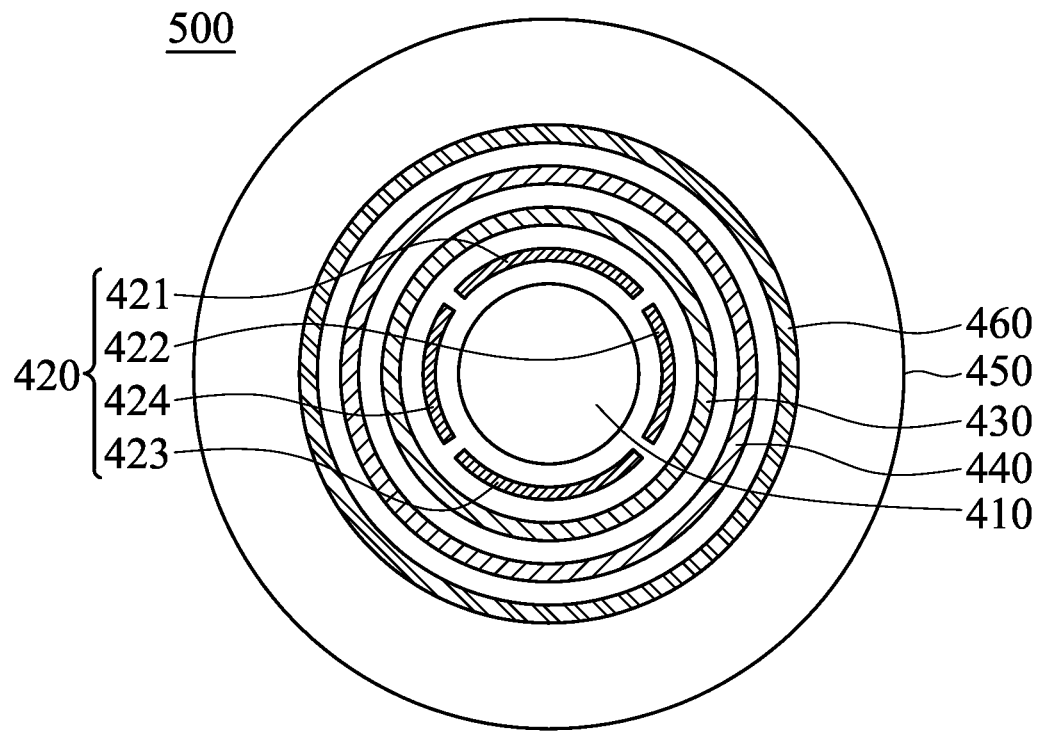
FIG. 5 is a top view of a contact lens according to an embodiment of the invention.

FIG. 5 is a top view of a contact lens 500 according to an embodiment of the invention. FIG. 5 is similar to FIG. 4. In the embodiment of FIG. 5, the contact lens 500 further includes a third ring-shaped metal structure 460. The second ring-shaped metal structure 440 is surrounded by the third ring-shaped metal structure 460. According to practical measurements, the incorporation of the third ring-shaped metal structure 460 can enhance the overall directing performance. Other features of the contact lens 500 of FIG. 5 are similar to those of the contact lens 400 of FIG. 4. Accordingly, the two embodiments can achieve similar levels of performance.

Figure 6:
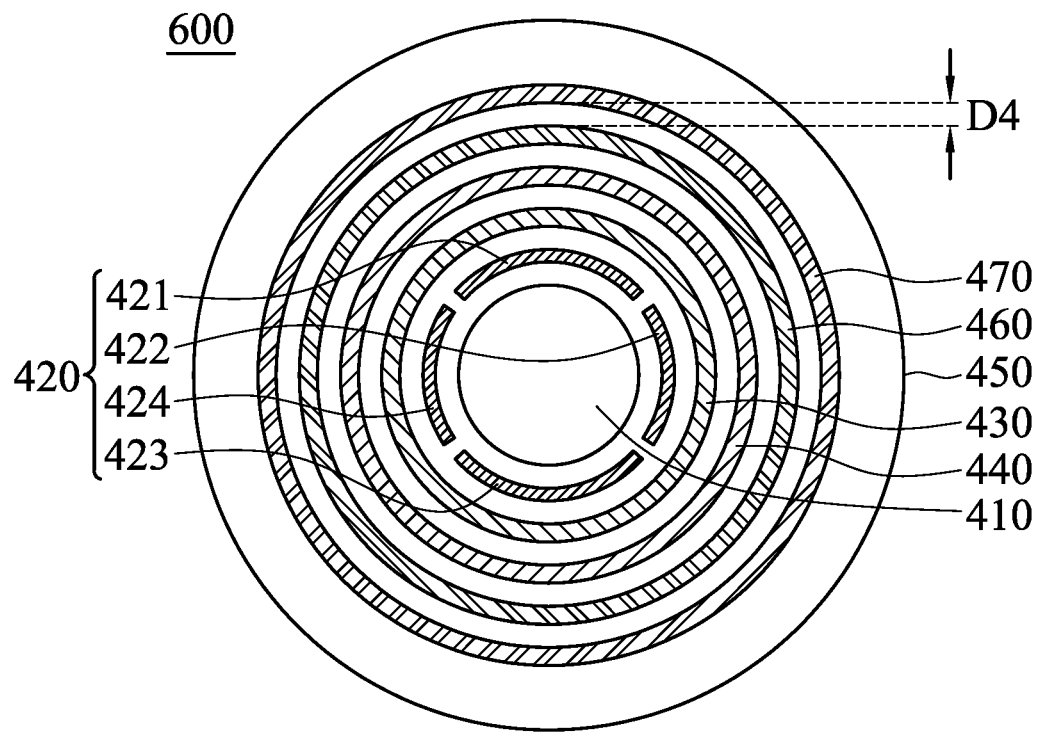
FIG. 6 is a top view of a contact lens according to an embodiment of the invention.

FIG. 6 is a top view of a contact lens 600 according to an embodiment of the invention. FIG. 6 is similar to FIG. 5. In the embodiment of FIG. 6, the contact lens 600 further includes a fourth ring-shaped metal structure 470. The third ring-shaped metal structure 460 is surrounded by the fourth ring-shaped metal structure 470. According to practical measurements, the incorporation of the fourth ring-shaped metal structure 470 can enhance the overall directing performance. In addition, the second distance D4 between any two adjacent ring-shaped metal structures, which are selected among the first ring-shaped metal structure 430, the second ring-shaped metal structure 440, the third ring-shaped metal structure 460, and the fourth ring-shaped metal structure 470, may be from 0.1 to 0.2 wavelength ($\lambda/10\sim2\lambda/10$) of the operational frequency band of the antenna element 420. Other features of the contact lens 600 of FIG. 6 are similar to those of the contact lens 500 of FIG. 5. Accordingly, the two embodiments can achieve similar levels of performance.

Figure 7:
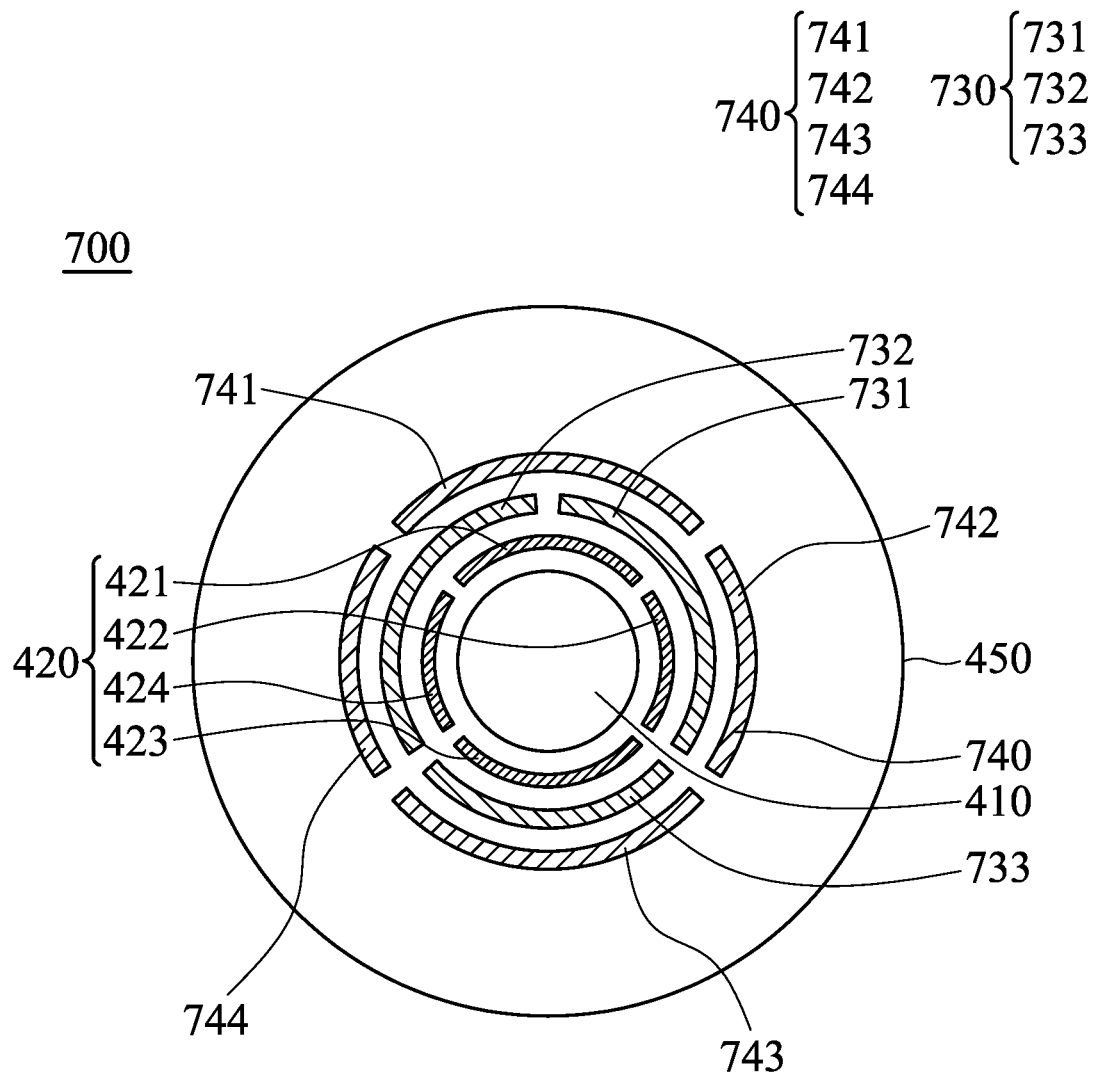
FIG. 7 is a top view of a contact lens according to an embodiment of the invention.

FIG. 7 is a top view of a contact lens 700 according to an embodiment of the invention. FIG. 7 is similar to FIG. 4. In the embodiment of FIG. 7, a first ring-shaped metal structure 730 of the contact lens 700 includes a plurality of discontinuous metal segments 731, 732 and 733, and a second ring-shaped metal structure 740 of the contact lens 700 also includes a plurality of discontinuous metal segments 741, 742, 743 and 744. The total number of above discontinuous metal segments is adjustable according to different requirements. According to practical measurements, even if the first ring-shaped metal structure 730 or the second ring-shaped metal structure 740 has one or more cut points, their directing performance will not be negatively affected. Other features of the contact lens 700 of FIG. 7 are similar to those of the contact lens 400 of FIG. 4. Accordingly, the two embodiments can achieve similar levels of performance.

The invention proposed a novel contact lens. In comparison to the conventional design, the invention has at least the advantages of providing the communication function, reducing the whole size, and increasing the overall operational bandwidth. Therefore, the invention is suitable for application in a variety of devices.

Note that the above element parameters are not limitations of the invention. A designer can fine-tune these setting values according to different requirements. It should be understood that the contact lens of the invention is not limited to the configurations of FIGS. 1-7. The invention may include any one or more features of any one or more embodiments of FIGS. 1-7. In other words, not all of the features displayed in the figures should be implemented in the contact lens of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A contact lens for communication, comprising:
   a display unit;
   an antenna element, wherein the antenna element is adjacent to the display unit;
   a first ring-shaped metal structure, wherein the display unit and the antenna element are surrounded by the first ring-shaped metal structure;
   a second ring-shaped metal structure, wherein the first ring-shaped metal structure is surrounded by the second ring-shaped metal structure; and a transparent element, wherein the display unit, the antenna element, the first ring-shaped metal structure, and the second ring-shaped metal structure are disposed on the transparent element;

wherein each of the first ring-shaped metal structure and the second ring-shaped metal structure is used as a director of the antenna element, so as to modify a radiation pattern of the antenna element.

2. The contact lens as claimed in claim 1, wherein the antenna element covers an operational frequency band, and the operational frequency band is higher than or equal to 60 GHz.

3. The contact lens as claimed in claim 2, wherein a first distance between the antenna element and the display unit is shorter than or equal to 0.25 wavelength of the operational frequency band.

4. The contact lens as claimed in claim 2, wherein a second distance between the first ring-shaped metal structure and the second ring-shaped metal structure is from 0.1 to 0.2 wavelength of the operational frequency band.

5. The contact lens as claimed in claim 1, wherein the display unit substantially has a hexagonal shape or a circular shape.

6. The contact lens as claimed in claim 1, wherein the display unit comprises a metal sidewall, and the metal sidewall is used as a reflector of the antenna element.

7. The contact lens as claimed in claim 1, wherein the antenna element comprises:
a plurality of radiation elements, wherein the radiation elements are separate from each other and are adjacent to the display unit.

8. The contact lens as claimed in claim 1, wherein the first ring-shaped metal structure substantially has a circular ring shape.

9. The contact lens as claimed in claim 8, wherein a diameter of the first ring-shaped metal structure is greater than a pupil diameter of an eyeball.

10. The contact lens as claimed in claim 8, wherein a diameter of the first ring-shaped metal structure is greater than an iris diameter of an eyeball.

11. The contact lens as claimed in claim 1, wherein each of the first ring-shaped metal structure and the second ring-shaped metal structure is used as a director of the antenna element.

12. The contact lens as claimed in claim 1, wherein each of the first ring-shaped metal structure and the second ring-shaped metal structure is an energy storage element.

13. The contact lens as claimed in claim 12, wherein the energy storage element is a thin film photovoltaic cell.

14. The contact lens as claimed in claim 1, wherein each of the first ring-shaped metal structure and the second ring-shaped metal structure comprises a plurality of discontinuous metal segments.

15. The contact lens as claimed in claim 1, further comprising:
a third ring-shaped metal structure, wherein the second ring-shaped metal structure is surrounded by the third ring-shaped metal structure.

16. The contact lens as claimed in claim 15, further comprising:
a fourth ring-shaped metal structure, wherein the third ring-shaped metal structure is surrounded by the fourth ring-shaped metal structure.

17. The contact lens as claimed in claim 1, wherein the transparent element is made of a hydrogel material.

\* \* \* \* \*